(12) United States Patent
Imai et al.

(10) Patent No.: US 12,223,384 B2
(45) Date of Patent: Feb. 11, 2025

(54) READING CONTROL DEVICE, READING CONTROL METHOD, AND VEHICLE

(71) Applicant: ISUZU MOTORS LIMITED, Tokyo (JP)

(72) Inventors: Akira Imai, Fujisawa (JP); Masakazu Ishimaru, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 18/550,540

(22) PCT Filed: Mar. 18, 2022

(86) PCT No.: PCT/JP2022/012673
§ 371 (c)(1),
(2) Date: Sep. 14, 2023

(87) PCT Pub. No.: WO2022/202678
PCT Pub. Date: Sep. 29, 2022

(65) Prior Publication Data
US 2024/0176968 A1    May 30, 2024

(30) Foreign Application Priority Data
Mar. 22, 2021   (JP) ................................ 2021-047632

(51) Int. Cl.
*G06K 7/10* (2006.01)
(52) U.S. Cl.
CPC ................ *G06K 7/10366* (2013.01)
(58) Field of Classification Search
CPC ......... G06K 7/10366; G06K 7/00; G06K 7/08
USPC ...................................... 235/451, 439, 449
See application file for complete search history.

(56) References Cited

U.S. PATENT DOCUMENTS

2010/0253519 A1* 10/2010 Brackmann ............... B60P 3/03
340/572.1

FOREIGN PATENT DOCUMENTS

| JP | 2008-030929 A |   | 2/2008 |
| JP | 2008-133085 A |   | 6/2008 |
| JP | 2014189361 A | * | 10/2014 |

OTHER PUBLICATIONS

International Search Report from International Application No. PCT/JP2022/012673 mailed May 17, 2022.

* cited by examiner

*Primary Examiner* — Edwyn Labaze
(74) *Attorney, Agent, or Firm* — Shih IP Law Group, PLLC.

(57) ABSTRACT

A reading control device that controls reading of tags by reading devices provided at positions that are on a pair of wings attached to sides of a cargo bed of a vehicle, and face a cargo compartment includes: an identifying section that identifies that either one of the pair of wings is opened; and a reading control section that causes a reading device attached to an opened wing in the pair of wings to emit an electromagnetic wave for reading a tag, and does not cause a reading device attached to an unopened wing to emit the electromagnetic wave in a case where the identifying section identifies that either one of the pair of wings is opened.

6 Claims, 7 Drawing Sheets

READING CONTROL DEVICE, READING CONTROL METHOD, AND VEHICLE

CROSS-REFERENCE TO RELATED APPLICATIONS

The present application is a U.S. National Stage entry of PCT Application number PCT/JP2022/012673, filed on Mar. 18, 2022, which claims priority under 35 U.S.C § 119(a) to Japanese Patent Application No. 2021-047632, filed on Mar. 22, 2021, contents of which are incorporated herein by reference in their entirety.

TECHNICAL FIELD

The present invention relates to a reading control device that reads tags, a reading control method and a vehicle having the reading control device mounted thereon.

BACKGROUND OF THE INVENTION

There are known technologies in which, for the purpose of managing items being delivered, reading devices are provided to a cargo bed, and the reading devices are caused to read information recorded on tags attached to the items (e.g. Patent Document 1).

Prior Art

Patent Document

Patent Document 1: Japanese Patent Application Publication No. 2008-30929

SUMMARY OF INVENTION

Problems to be Solved by the Invention

Some vehicles have openable wings attached to the sides of their cargo beds. It becomes possible for workers to carry in items from a side of a cargo bed in a state where a wing is opened. In a technology described in Patent Document 1, electromagnetic waves emitted by reading devices in a state where a wing is opened are emitted to the outside of the cargo bed. At this time, the reading devices read tags attached to items around the cargo bed also. Because of this, there has been a problem with the technology described in Patent Document 1 that distinctions cannot be made between items that have been carried into the cargo bed and items that have not been carried into the cargo bed.

In view of this, the present invention has been made taking these matters into consideration, and an object thereof is to provide a technology that makes it possible to reduce reading, by reading devices, of tags attached to items around a cargo bed.

Means for Solving the Problems

A reading control device according to a first aspect of the present invention is a reading control device that controls reading of tags by reading devices provided at positions that are on a pair of wings attached to sides of a cargo bed of a vehicle, and face a cargo compartment, the reading control device including: an identifying section that identifies that either one of the pair of wings is opened; and a reading control section that causes a reading device attached to an opened wing in the pair of wings to emit an electromagnetic wave for reading a tag, and does not cause a reading device attached to an unopened wing to emit the electromagnetic wave in a case where the identifying section identifies that either one of the pair of wings is opened.

The reading control section may cause the reading devices attached to the pair of wings to emit the electromagnetic waves in a case where the identifying section identifies that none of the pair of wings are opened. The reading control section may cause the reading devices to emit the electromagnetic waves at different intensities depending on whether the identifying section identifies that a wing is opened or the identifying section identifies that a wing is not opened.

The reading control section may cause a reading device attached to an opened wing in the pair of wings to emit the electromagnetic wave at first electric power in a case where the identifying section identifies that either one of the pair of wings is opened, and may cause a reading device attached to at least one of the pair of wings to emit the electromagnetic wave at second electric power greater than the first electric power in a case where the identifying section identifies that none of the pair of wings are opened. The reading control section may read identification information for identifying the tags from a plurality of the tags, and the reading control device may further include an output section that output, to a display section, a list of the identification information about the plurality of tags read by the reading control section.

A vehicle according to a second aspect of the present invention is a vehicle including: reading devices provided at positions that are on a pair of wings attached to sides of a cargo bed of the vehicle, and face a cargo compartment; and a reading control device that controls reading of tags by the reading devices, in which the reading control device includes: an identifying section that identifies that either one of the pair of wings is opened; and a reading control section that transmits control information for instructing to read a tag to a reading device attached to an opened wing in the pair of wings, and does not transmit the control information to a reading device attached to an unopened wing in a case where the identifying section identifies that either one of the pair of wings is opened, and each of the reading devices includes: a receiving section that receives the control information from the reading control device; and a reading section that reads a tag by emitting an electromagnetic wave to the tag in a case where the receiving section receives the control information.

A reading control method according to a third aspect of the present invention is a reading control method performed by a computer to control reading of tags by reading devices provided at positions that are on a pair of wings attached to sides of a cargo bed of a vehicle, and face a cargo compartment, the reading control method including: a step of identifying that either one of the pair of wings is opened; and a step of causing a reading device attached to an opened wing in the pair of wings to emit an electromagnetic wave for reading a tag, and not causing a reading device attached to an unopened wing to emit an electromagnetic wave for reading a tag in a case where it is identified that either one of the pair of wings is opened.

DETAILED DESCRIPTION OF THE INVENTION

Overview of Reading System S

Figure 1:
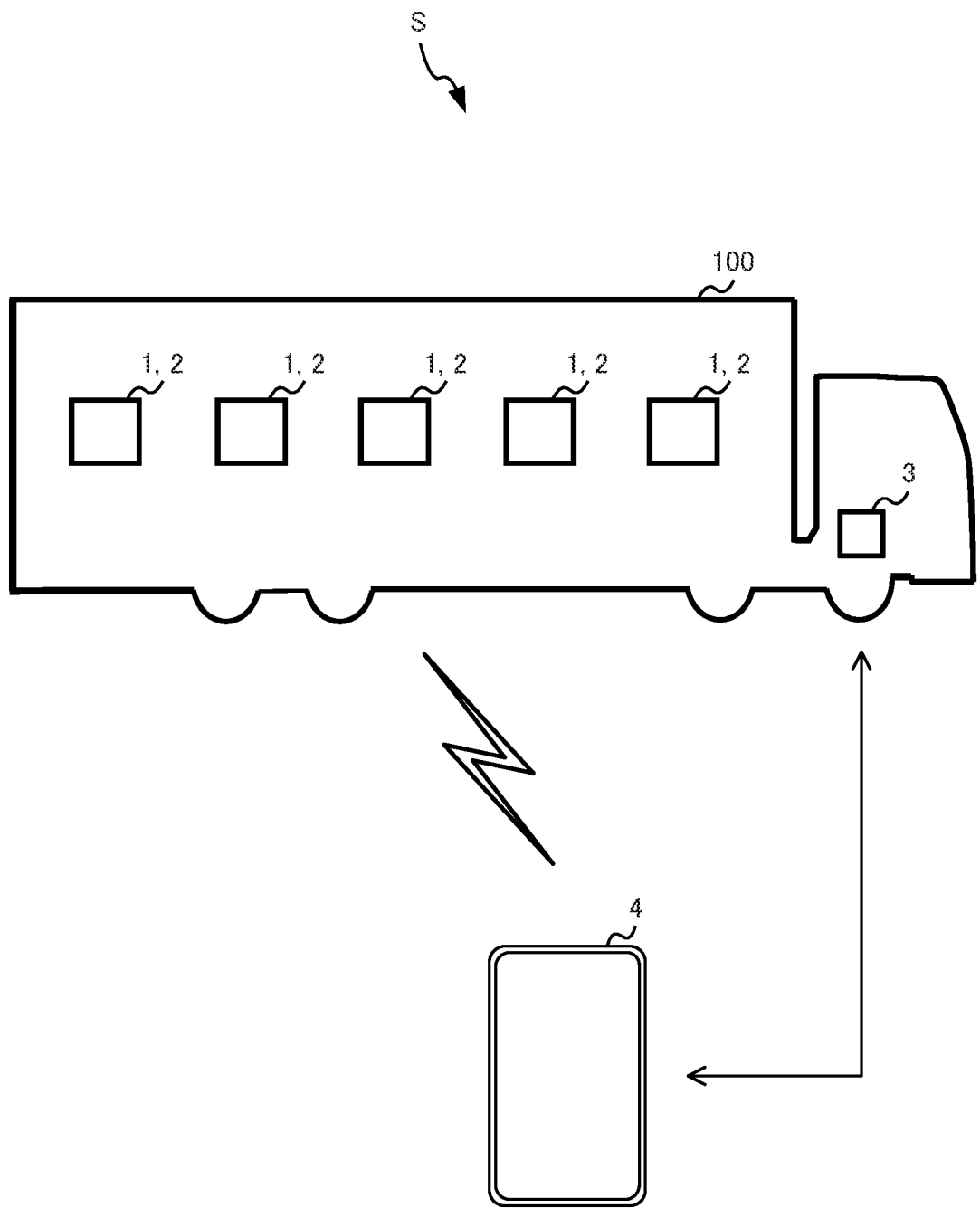
FIG. 1 is a figure depicting an overview of a reading system according to an embodiment.
Figure 2:
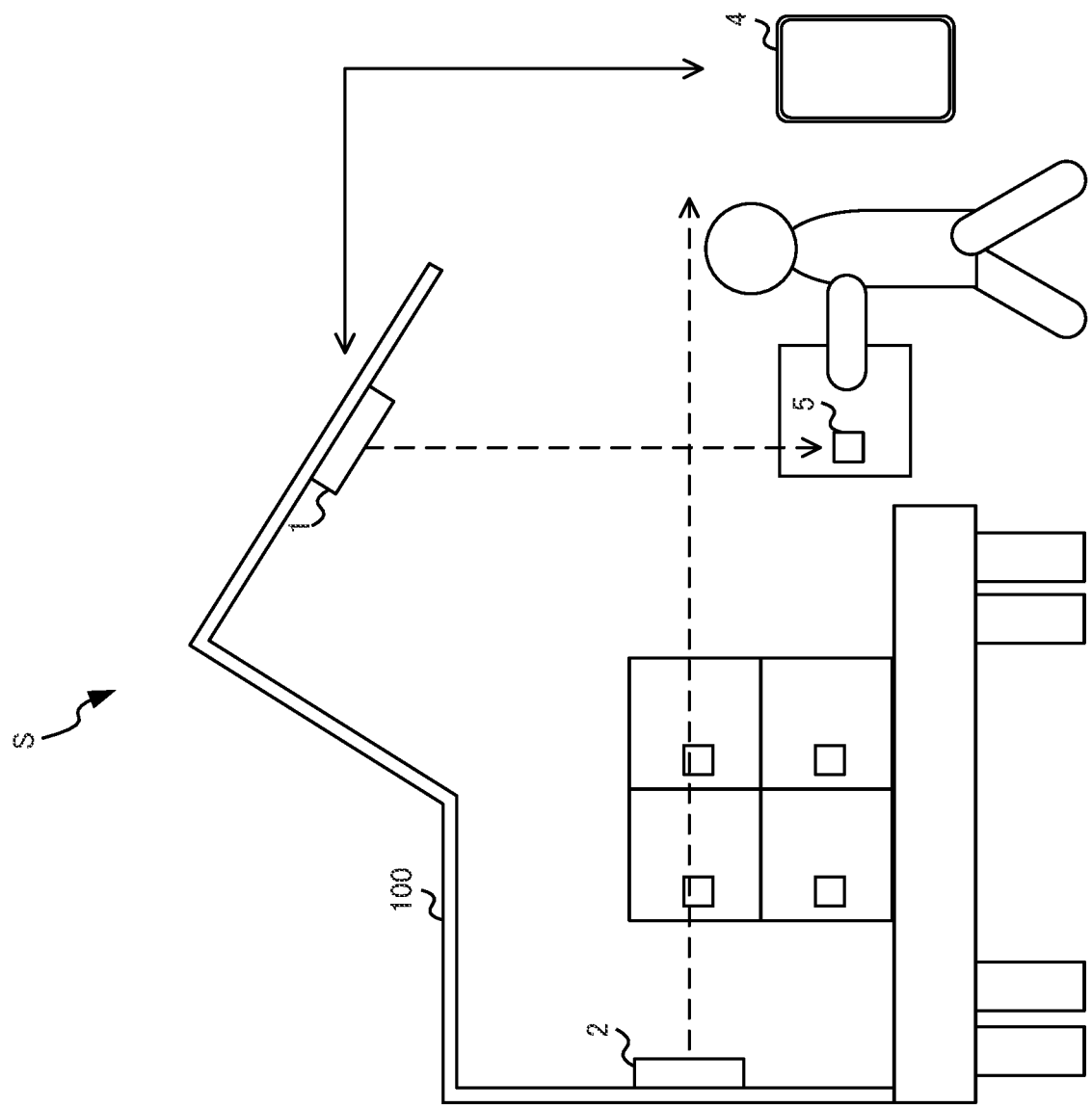
FIG. 2 is a figure depicting the overview of the reading system according to the embodiment.

FIG. 1 and FIG. 2 are figures depicting an overview of a reading system S of the present embodiment. FIG. 1 depicts the configuration of the reading system S. FIG. 2 depicts the look of reading of tags by reading devices. The reading system S includes reading devices 1, reading devices 2 and a vehicle control device 3 that are provided to a vehicle 100, and a reading control device 4. FIG. 1 illustrates a case where the positions of the reading devices 1 and the reading devices 2 as seen in the leftward/rightward direction of the vehicle 100 are the same positions.

The vehicle 100 is a vehicle having a pair of openable and closable left and right wings that are provided to the sides of its cargo bed. As depicted in FIG. 1, a plurality of the reading devices 1 and the reading devices 2 are arranged on the cargo bed. The plurality of reading devices 1 and reading devices 2 are arranged along the front/back direction of the vehicle 100. As depicted in FIG. 2, the reading devices 1 and the reading devices 2 are provided at positions that are on the left and right wings of the vehicle 100, and face the cargo compartment. The reading devices 1 and the reading devices 2 read tags 5 that are attached to items by near field wireless communication such as RFID (Radio Frequency IDentifier). For example, the tags 5 are RFID tags not including batteries. The tags 5 have stored thereon identification information for identifying the tags. For example, the identification information is TIDs (Tag IDs) or EPCs (Electronic Product Codes).

The reading devices 1 and the reading devices 2 supply electric power for wireless communication to tags 5 by a contactless power supply scheme such as a radio wave scheme, and receive identification information transmitted by the tags 5. The plurality of reading devices 1 and reading devices 2 can read tags 5 almost simultaneously while reducing interference between radio waves of the plurality of reading devices 1 and reading devices 2 by slightly staggering the timing of emission of electromagnetic waves. In addition, the reading devices 1 and the reading devices 2 can read a plurality of tags 5 almost simultaneously by slightly staggering the timing of communication with the plurality of tags 5.

The reading devices 1 or 2 read tags 5 by emitting electromagnetic waves downward in a state where a wing to which the reading devices are attached are opened, as represented by a downward broken line in FIG. 2. On the other hand, in a state where none of the left and right wings are opened, both the reading devices 1 and the reading devices 2 read tags 5. The reading devices 1 and the reading devices 2 transmit information read out from tags 5 to the reading control device 4.

For example, the vehicle control device 3 is an ECU (Electronic Control Unit). The vehicle control device 3 drives a motor (not depicted), and opens and closes the left and right wings. The vehicle control device 3 communicates with the reading control device 4 via wireless communication such as Wi-Fi (registered trademark). The vehicle control device 3 transmits, to the reading control device 4, state information representing the opened and closed states of the pair of left and right wings.

For example, the reading control device 4 is a smartphone used by a driver. The reading control device 4 communicates with the reading devices 1, the reading devices 2 and the vehicle control device 3 via wireless communication such as Bluetooth (registered trademark) or Wi-Fi (registered trademark). The reading control device 4 controls reading of tags 5 by the reading devices 1 or the reading devices 2.

First, the reading control device 4 identifies that either one of the pair of wings of the vehicle 100 is opened, on the basis of the state information received from the vehicle control device 3. The reading control device 4 identifies an opened wing. At this time, if the reading control device 4 causes reading devices attached to an unopened wing to emit electromagnetic waves, the electromagnetic waves from the reading devices are emitted toward the other wing as indicated by a horizontal broken-line arrow in FIG. 2. There is a possibility that due to the emission of the electromagnetic waves to the outside of the cargo bed, the reading control device 4 reads tags outside the cargo compartment. Because of this, the reading control device 4 does not cause the reading devices attached to the unopened wing to emit electromagnetic waves.

The reading control device 4 causes reading devices attached to the opened wing to emit electromagnetic waves for reading tags 5. Since the electromagnetic waves emitted by the reading devices attached to the opened wing are emitted downward from the reading devices, they are unlikely to be emitted to the outside of the cargo compartment. In this manner, the reading control device 4 can reduce reading of even tags outside the cargo compartment when the reading control device 4 is reading tags 5 below the reading devices.

Configuration of Reading Control Device 4

Figure 3:
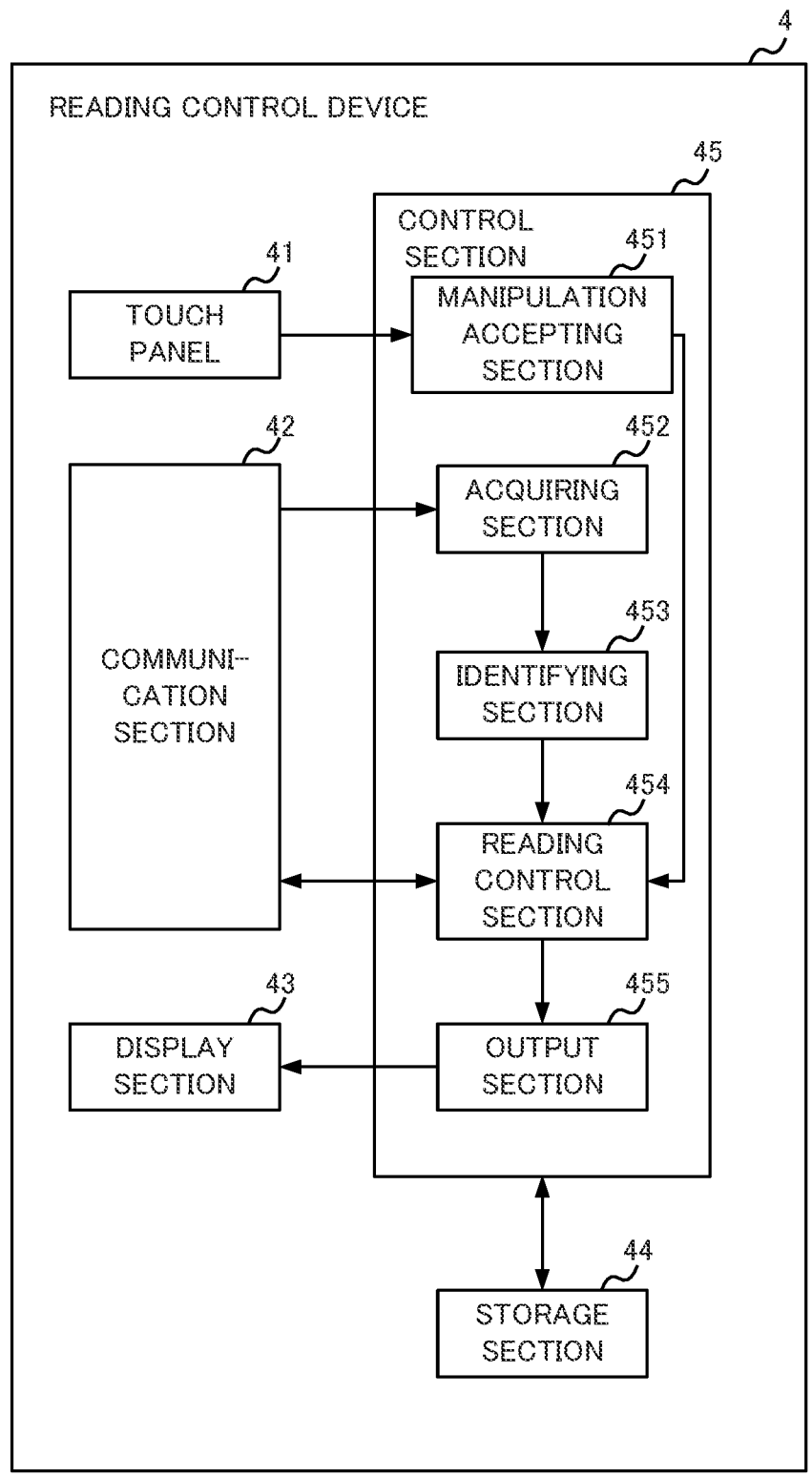
FIG. 3 depicts the configuration of a reading control device.

FIG. 3 depicts the configuration of the reading control device 4. The reading control device 4 includes a touch panel 41, a communication section 42, a display section 43, a storage section 44 and a control section 45. The touch panel 41 detects user manipulation on the display section 43 by using a touch sensor. The communication section 42 is a communication module for communication with the reading devices 1, the reading devices 2 and the vehicle control device 3 by wireless communication such as Bluetooth or Wi-Fi. The display section 43 displays characters, images and the like.

For example, the storage section 44 is configured by using a ROM (Read Only Memory), a RAM (Random Access Memory) and the like. The storage section 44 stores various types of program and various types of data for causing the control section 45 to perform its functions.

For example, the control section 45 is a CPU (Central Processing Unit). By executing the programs stored on the storage section 44, the control section 45 functions as a manipulation accepting section 451, an acquiring section 452, an identifying section 453, a reading control section 454 and an output section 455.

The manipulation accepting section 451 accepts user manipulation via the touch panel 41. For example, the manipulation accepting section 451 accepts user manipulation for instructing the reading devices 1 or the reading devices 2 to read tags 5.

The acquiring section 452 communicates with the vehicle control device 3 via the communication section 42. The acquiring section 452 acquires, from the vehicle control device 3, the state information representing the opened and closed states of the pair of wings of the vehicle 100. The acquiring section 452 outputs the acquired state information to the identifying section 453.

The identifying section 453 identifies that either one of the pair of wings of the vehicle 100 is opened. The identifying section 453 identifies that either one of the pair of wings is opened, and identifies an opened wing on the basis of the state information acquired by the acquiring section 452.

The reading control section 454 controls reading of tags 5 by the reading devices 1 or 2. For example, in a case where the manipulation accepting section 451 accepted user manipulation for instructing to read tags 5, the reading control section 454 generates control information for instructing to read tags 5, and transmits the generated control information to the reading devices 1 or 2.

In a case where the identifying section 453 identified that either one of the pair of wings is opened, the reading control section 454 causes reading devices attached to the opened wing in the pair of wings to emit electromagnetic waves for reading tags 5. At this time, the reading control section 454 does not cause the reading devices 1 or 2 that are attached to an unopened wing to emit electromagnetic waves.

Figure 4:
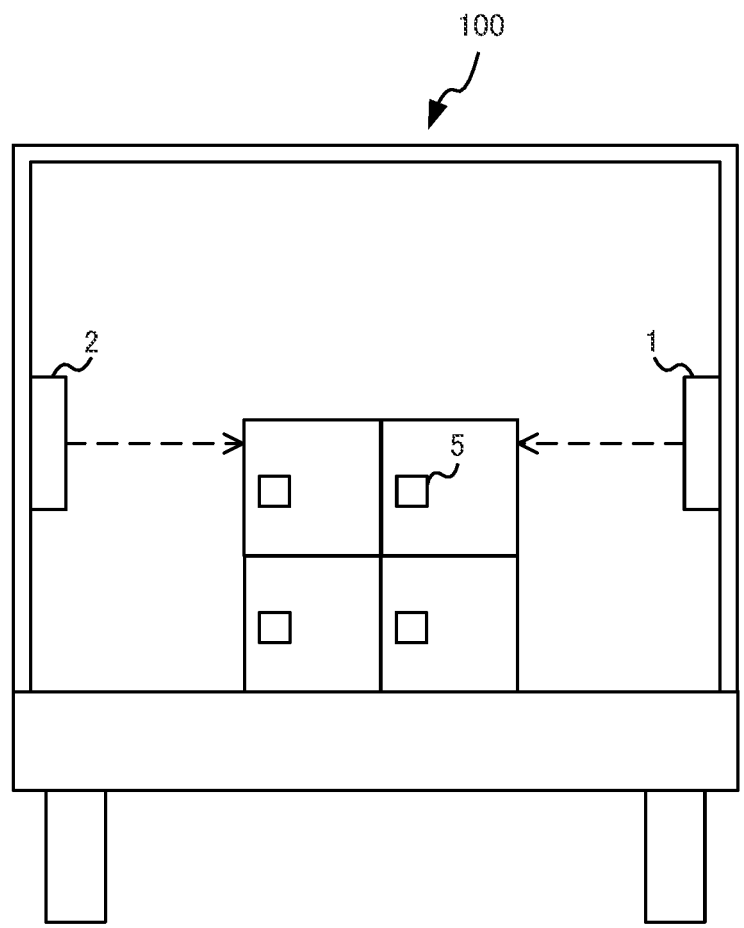
FIG. 4 depicts the look of reading of tags by a reading control section in a state where wings are not opened.

In a case where the identifying section 453 identified that none of the pair of wings are opened, the reading control section 454 causes both the reading devices 1 and the reading devices 2 attached to the pair of wings to emit electromagnetic waves. FIG. 4 depicts the look of reading of tags 5 by the reading control section 454 in a state where the wings are not opened. In the state where the wings are not opened, the electromagnetic waves from the reading devices 1 and 2 are not emitted to the outside of the cargo compartment almost at all. Because of this, by causing both the reading devices 1 and the reading devices 2 to emit electromagnetic waves, the reading control section 454 can reduce the occurrence of a situation where there are unread tags 5 when tags 5 of items transferred into the cargo compartment are to be read. Note that the reading control section 454 may cause either the reading devices 1 or the reading devices 2 to emit electromagnetic waves in the state where the wings are not opened.

The reading control section 454 causes the reading devices to emit electromagnetic waves at different intensities depending on whether a wing is opened or a wing is not opened. For example, in a case where the identifying section 453 identifies that either one of the pair of wings is opened, the reading control section 454 causes reading devices attached to an opened wing in the pair of wings to emit electromagnetic waves at first electric power. The first electric power is set to such electric power that tags 5 outside the cargo compartment of the vehicle 100 are not read by reading devices.

In a case where the identifying section 453 identified that none of the pair of wings are opened, the reading control section 454 causes the reading devices 1 or 2 attached to at least one of the pair of wings to emit electromagnetic waves at second electric power. The second electric power is greater than the first electric power. For example, the second electric power is the maximum electric power of the reading devices 1 or 2. Since the reading control section 454 causes the reading devices 1 or 2 to emit electromagnetic waves at the relatively low first electric power in a state where a wing of the vehicle 100 is opened, it is possible to reduce reading of tags outside the cargo compartment by the reading devices 1 or 2. The reading control section 454 reads identification information for identifying tags 5 from the tags 5. The reading control section 454 outputs the read identification information to the output section 455.

The output section 455 outputs, to the display section 43, the identification information about the tags 5 read out by the reading control section 454. For example, the output section 455 displays the identification information about a plurality of the tags 5 in a list on the display section 43.

Configuration of Reading Devices 1 and 2

Figure 5:
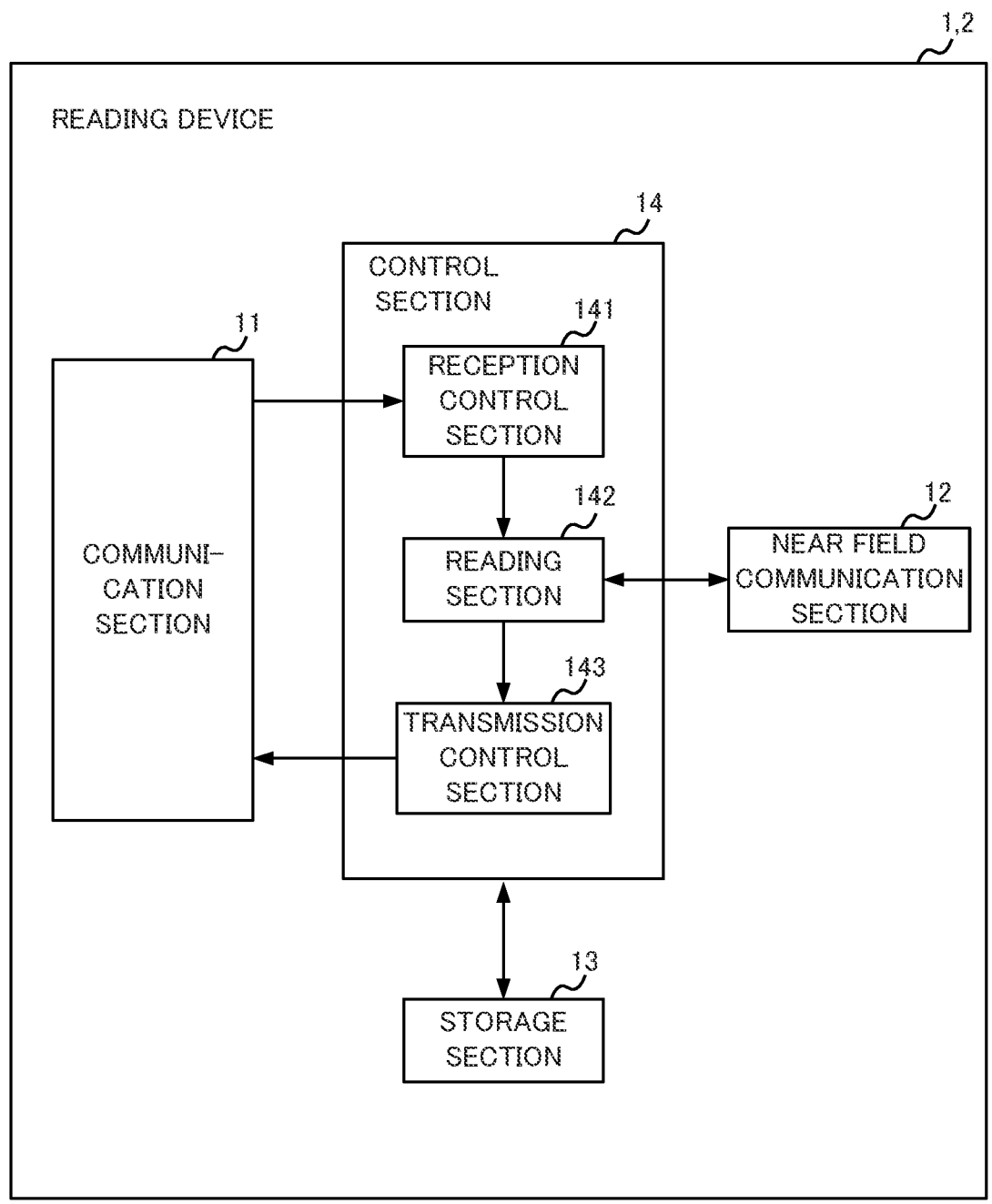
FIG. 5 is a figure depicting the configuration of reading devices.

FIG. 5 is a figure depicting the configuration of the reading devices 1 and 2. It is assumed that both the reading devices 1 and the reading devices 2 have the same configuration. Each reading device 1 or 2 includes a communication section 11, a near field communication section 12, a storage section 13 and a control section 14.

The communication section 11 is a communication module for communication with the reading control device 4 by wireless communication such as Bluetooth or Wi-Fi. For example, the near field communication section 12 is a communication unit including a coiled antenna, a modulation circuit and a demodulation circuit. By using the coiled antenna, the near field communication section 12 receives an electromagnetic wave emitted by a tag 5 provided to an item in the cargo compartment, and demodulates the received electromagnetic wave by using the demodulation circuit. The near field communication section 12 supplies electric power for wireless communication to a tag 5 by a contactless power supply scheme such as a radio wave scheme, and receives information transmitted by the tag 5.

For example, the storage section 13 is configured by using a ROM, a RAM and the like. The storage section 13 stores various types of program and various types of data for causing the control section 14 to perform its functions. For example, the control section 14 is a CPU. By executing the programs stored on the storage section 13, the control section 14 functions as a reception control section 141, a reading section 142 and a transmission control section 143.

The reception control section 141 communicates with the reading control device 4 via the communication section 11. For example, the reception control section 141 receives, from the reading control device 4, control information for instructing to read a tag 5. The reception control section 141 outputs the received control information to the reading section 142.

The reading section 142 reads a tag 5 via the near field communication section 12. In a case where the reception control section 141 received the control information for instructing to read a tag 5, the reading section 142 reads a tag 5 by emitting an electromagnetic wave toward the tag 5. For example, the reading section 142 acquires identification information about the tag 5 from the tag 5. The reading section 142 outputs the acquired identification information to the transmission control section 143.

The transmission control section 143 communicates with the reading control device 4 via the communication section 11. For example, the transmission control section 143 transmits, to the reading control device 4, the identification information about the tag 5 acquired by the reading section 142.

Processing Procedure Performed by Reading Control Device 4 to Read Tags 5

Figure 6:
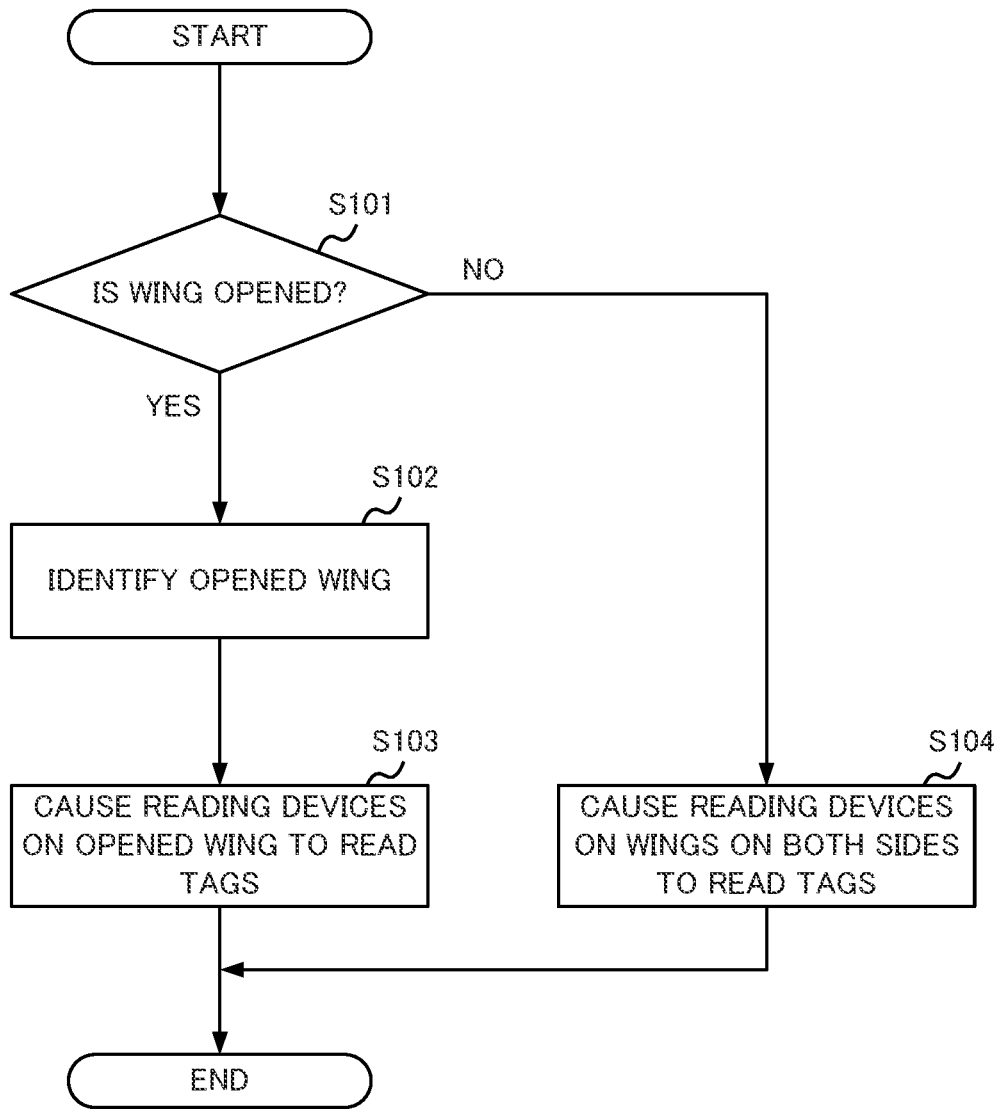
FIG. 6 is a flowchart depicting a processing procedure performed by the reading control device to read tags.

FIG. 6 is a flowchart depicting a processing procedure performed by the reading control device 4 to read tags 5. For example, this processing procedure is started when the manipulation accepting section 451 accepted user manipulation for instructing the reading devices 1 or the reading devices 2 to read tags 5. First, the identifying section 453 identifies whether or not either one of the pair of wings attached to the sides of the cargo bed of the vehicle 100 is opened (S101). In a case where either one of the pair of wings is opened (YES at S101), the identifying section 453 identifies an opened wing (S102). The reading control section 454 transmits control information for instructing to read tags 5 to reading devices attached to the opened wing in the pair of wings, and causes the reading devices to read the tags 5 (S103). At this time, the reading control section 454 does not transmit the control information for instructing to read tags 5 to reading devices attached to an unopened wing.

In a case where the identifying section 453 identified that none of the pair of wings are opened in the assessment at S101 (NO at S101), the reading control section 454 transmits control information for instructing to read tags 5 to both the reading devices 1 and the reading devices 2 attached to the wings, and causes the reading devices 1 and 2 to read tags 5 (S104).

Modification Examples

Figure 7:
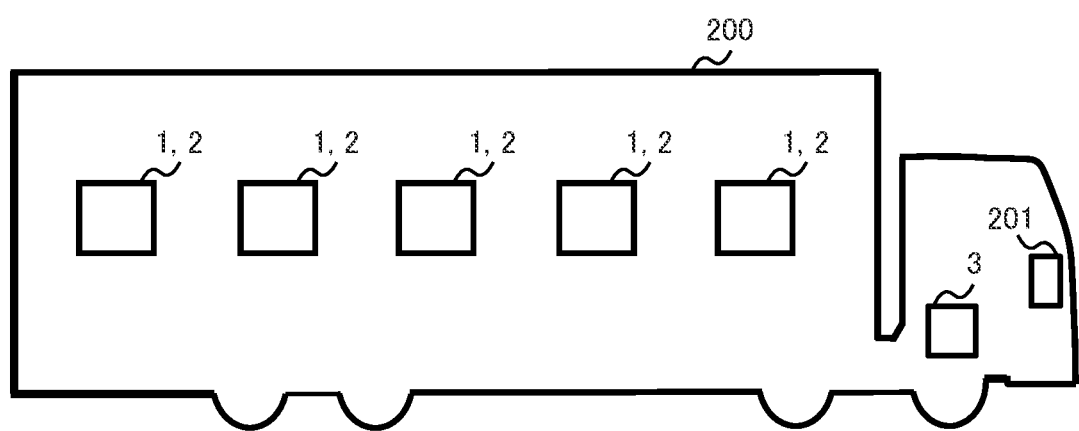
FIG. 7 depicts an example of a case where the reading control device is mounted on a vehicle.

Examples of the reading control device are not limited to smartphones. For example, the reading control device may be an in-vehicle controller mounted on a vehicle. FIG. 7 depicts an example of a case where the reading control device 201 is mounted on a vehicle 200. The reading devices 1, the reading devices 2 and the vehicle control device 3 depicted in FIG. 7 are similar to the reading devices 1, the reading devices 2 and the vehicle control device 3 depicted in FIG. 2. The reading control device 201 depicted in FIG. 7 is an infotainment device such as display audio equipment, for example. Since the reading control device 201 is similar to the reading control device in FIG. 1 except that it is mounted on the vehicle 200, an explanation thereof is omitted. In addition, the reading control device may be a personal computer installed at a warehouse or the like, and may be configured to read tags 5 provided to items when vehicles enter the warehouse.

Effects Attained with Reading Control Device of Present Embodiment

The reading control device 4 of the present embodiment causes reading devices attached to an opened wing to emit electromagnetic waves for reading tags 5. On the other hand, the reading control device 4 does not cause the reading devices 2 attached to an unopened wing to emit electromagnetic waves. In this manner, the reading control device 4 can reduce reading of even tags outside the cargo compartment when the reading control device 4 is reading tags 5 below the reading devices.

Although the present invention has been explained thus far by using an embodiment, the technical scope of the present invention is not limited by the scope of the description of the embodiment described above, but can be modified and changed variously within the scope of the gist. For example, all or some of devices can be configured in a functionally or physically distributed/integrated manner in any units. In addition, embodiments of the present invention include also new embodiments that are generated by combining any ones of a plurality of embodiments. Effects of the new embodiments generated by the combination combine effects of the original embodiments.

DESCRIPTION OF THE REFERENCE NUMERALS

1: Reading device
2: Reading device
3: Vehicle control device
4: Reading control device
5: Tag
11: Communication section
12: Near field communication section
13: Storage section
14: Control section
41: Touch panel
42: Communication section
43: Display section
44: Storage section
45: Control section
100: Vehicle
141: Reception control section
142: Reading section
143: Transmission control section
200: Vehicle
201: Reading control device
451: Manipulation accepting section
452: Acquiring section
453: Identifying section
454: Reading control section
455: Output section

The invention claimed is:

1. A reading control device that controls reading of tags by reading devices provided at positions that are on a pair of wings attached to sides of a cargo bed of a vehicle, and face a cargo compartment, the reading control device comprising:
an identifying section that identifies that either one of the pair of wings is opened; and
a reading control section that causes a reading device attached to an opened wing in the pair of wings to emit an electromagnetic wave for reading a tag, and does not cause a reading device attached to an unopened wing to emit the electromagnetic wave in a case where the identifying section identifies that either one of the pair of wings is opened,
wherein the reading control section;
causes the reading device attached to the opened wing in the pair of wings to emit the electromagnetic wave at a first electric power in a case where the identifying section identifies that either one of the pair of wings is opened, and
causes the reading device attached to at least one of the pair of wings to emit the electromagnetic wave at a second electric power greater than the first electric power in a case where the identifying section identifies that none of the pair of wings are opened.

2. The reading control device according to claim 1, wherein the reading control section causes the reading devices attached to the pair of wings to emit the electromagnetic waves in a case where the identifying section identifies that none of the pair of wings are opened.

3. The reading control device according to claim 1, wherein the reading control section causes the reading devices to emit the electromagnetic waves at different intensities depending on whether the identifying section identifies that a wing is opened or the identifying section identifies that a wing is not opened.

4. The reading control device according to claim 1, wherein
the reading control section reads identification information for identifying the tags from a plurality of the tags, and
the reading control device further comprises an output section that output, to a display section, a list of the identification information about the plurality of tags read by the reading control section.

5. A vehicle comprising:
reading devices provided at positions that are on a pair of wings attached to sides of a cargo bed of the vehicle, and face a cargo compartment; and
a reading control device that controls reading of tags by the reading devices,
wherein the reading control device includes:
an identifying section that identifies that either one of the pair of wings is opened; and
a reading control section that transmits control information for instructing to read a tag to a reading device attached to an opened wing in the pair of wings, and does not transmit the control information to a reading device attached to an unopened wing in a case where the identifying section identifies that either one of the pair of wings is opened,
wherein the reading control section:
causes the reading device attached to the opened wing in the pair of wings to emit the electromagnetic wave at a first electric power in a case where the identifying section identifies that either one of the pair of wings is opened, and
causes the reading device attached to at least one of the pair of wings to emit the electromagnetic wave at a second electric power greater than the first electric power in a case where the identifying section identifies that none of the pair of wings are opened, and
wherein each of the reading devices includes:
a receiving section that receives the control information from the reading control device; and
a reading section that reads a tag by emitting an electromagnetic wave to the tag in a case where the receiving section receives the control information.

6. A reading control method performed by a computer to control reading of tags by reading devices provided at positions that are on a pair of wings attached to sides of a cargo bed of a vehicle, and face a cargo compartment, the reading control method comprising:
a step of identifying that either one of the pair of wings is opened; and
a step of causing a reading device attached to an opened wing in the pair of wings to emit an electromagnetic wave for reading a tag, and not causing a reading device attached to an unopened wing to emit an electromagnetic wave for reading a tag in a case where it is identified that either one of the pair of wings is opened;
a step of causing the reading device attached to the opened wing in the pair of wings to emit the electromagnetic wave at a first electric power in a case where the identifying section identifies that either one of the pair of wings is opened; and
a step of causing the reading device attached to at least one of the pair of wings to emit the electromagnetic wave at a second electric power greater than the first electric power in a case where the identifying section identifies that none of the pair of wings are opened.

\* \* \* \* \*